(12) United States Patent
Staab et al.

(10) Patent No.: US 12,726,508 B2
(45) Date of Patent: Sep. 1, 2026

(54) DYNAMIC INTELLIGENT CYBER PLAYBOOKS

(71) Applicant: Raytheon Company, Arlington, VA (US)

(72) Inventors: Torsten A. Staab, Bristow, VA (US); Daniel S. Rose, Salado, TX (US); Travis R. Durbin, Pinehurst, NC (US)

(73) Assignee: Raytheon Company, Arlington, VA (US)

( * ) Notice: Subject to any disclaimer, the term of this patent is extended or adjusted under 35 U.S.C. 154(b) by 4 days.

(21) Appl. No.: 18/627,922

(22) Filed: Apr. 5, 2024

(65) Prior Publication Data

US 2024/0340306 A1 Oct. 10, 2024

Related U.S. Application Data

(60) Provisional application No. 63/494,901, filed on Apr. 7, 2023.

(51) Int. Cl.
*H04L 9/40* (2022.01)

(52) U.S. Cl.
CPC ...... *H04L 63/1441* (2013.01); *H04L 63/1416* (2013.01)

(58) Field of Classification Search
CPC ........................ H04L 63/1441; H04L 63/1416
See application file for complete search history.

(56) References Cited

U.S. PATENT DOCUMENTS

| | | | | |
|---|---|---|---|---|
| 9,652,317 | B2 * | 5/2017 | Dvir | G06F 11/0793 |
| 10,862,906 | B2 * | 12/2020 | Sharon | H04L 63/1416 |
| 11,074,512 | B1 | 7/2021 | Forte et al. | |
| 11,157,834 | B2 * | 10/2021 | Keanini | G06N 20/00 |
| 2019/0312890 | A1 * | 10/2019 | Perilli | H04L 63/145 |
| 2020/0012990 | A1 * | 1/2020 | Bhargava | H04L 41/06 |
| 2020/0193022 | A1 * | 6/2020 | Lunsford | H04L 63/1416 |
| 2021/0176257 | A1 * | 6/2021 | Yavo | H04L 63/02 |
| 2021/0306352 | A1 * | 9/2021 | Narula | G06N 5/04 |

* cited by examiner

*Primary Examiner* — Noura Zoubair
*Assistant Examiner* — Afaq Ali
(74) *Attorney, Agent, or Firm* — Schwegman Lundberg & Woessner, P.A.

(57) ABSTRACT

A method, involving; detecting an event; identifying one or more security tools that are currently part of an inventory of security tools; generating a playbook based on the inventory, the playbook being generated responsive to the event, the playbook being a script that includes one or more commands, each of the commands corresponding to a respective security tool in the inventory of security tools; and executing the playbook.

17 Claims, 6 Drawing Sheets

PLAYBOOK 400

ELECTRONIC_ARMOR(TERMINATE, 132242); 402

BOOT_SHIELD (LOCK_DRIVE, “C:”) 404

FORCEPOINT_DLP (LOCK_FOLDER “C:\\USER\DATA\\USER_NAME) 406

APP_GATE (REMOVE_ENDPOINT, 128.196.1.1.1); 408

DYNAMIC INTELLIGENT CYBER PLAYBOOKS

CLAIM OF PRIORITY

This patent application claims the benefit of U.S. Provisional Patent Application No. 63/494,901, filed Apr. 7, 2023, which is incorporated by reference herein in its entirety.

BACKGROUND

Computer security is the protection of computer systems and networks from unauthorized access, theft of information, as well as disruption, and information theft. Computer security professionals routinely process large data streams to identify security issues and discover remediation methods. Prompt identification and remediation of security issues is vital for the safe operation of entire sectors of government and industry, such as the defense and financial sectors for example.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided, comprising; detecting an event; identifying one or more security tools that are currently part of an inventory of security tools; generating a playbook based on the inventory, the playbook being generated responsive to the event, the playbook being a script that includes one or more commands, each of the commands corresponding to a respective security tool in the inventory of security tools; and executing the playbook.

According to aspects of the disclosure, a system is provided, comprising: a memory; and at least one processor that is operatively coupled to the memory, the at least one processor being configured to perform the operations of: detecting an event; identifying one or more security tools that are currently part of an inventory of security tools; generating a playbook based on the inventory, the playbook being generated responsive to the event, the playbook being a script that includes one or more commands, each of the commands corresponding to a respective security tool in the inventory of security tools; and executing the playbook.

According to aspects of the disclosure, a non-transitory computer-readable medium storing one or more processor-executable instructions, which, when executed by at least one processor cause the at least one processor to perform the operations of: detecting an event; identifying one or more security tools that are currently part of an inventory of security tools; generating a playbook based on the inventory, the playbook being generated responsive to the event, the playbook being a script that includes one or more commands, each of the commands corresponding to a respective security tool in the inventory of security tools; and executing the playbook.

BRIEF DESCRIPTION OF THE DRAWINGS

Other aspects, features, and advantages of the claimed disclosure will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
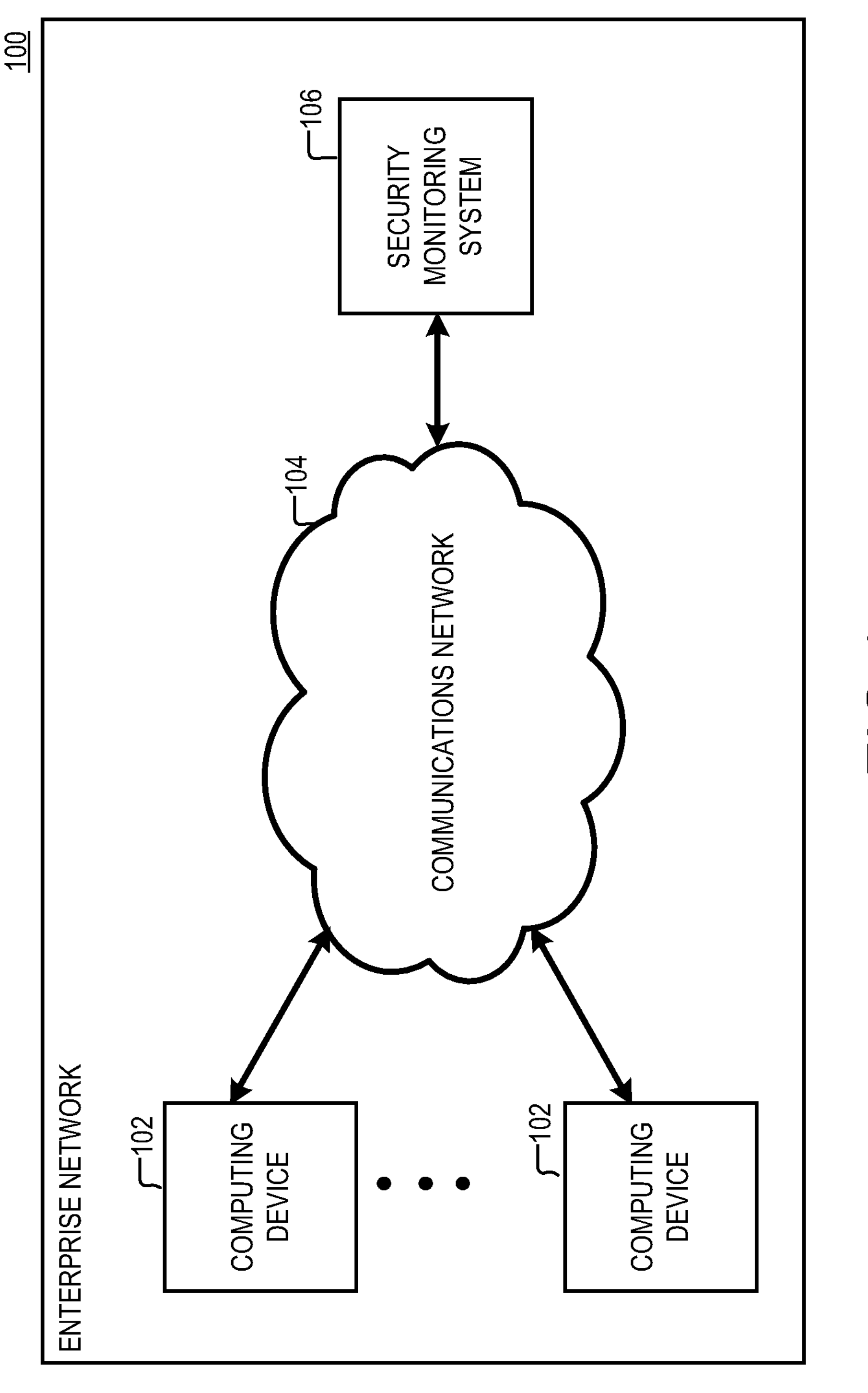
FIG. 1 is a diagram of an example of an enterprise network, according to aspects of the disclosure.

The current generation of cyber security solutions utilize so-called cyber playbooks (hereinafter "playbooks) to initiate and execute one or more cyber defensive actions (e.g., isolate a computer from a network, revoke a user's data access) in response to a cyber incident or attack. These playbooks are based on static, pre-defined scripts that are handcrafted and tailored by cyber security experts. The static nature of these playbooks limits their effectiveness, as they cannot adequately defend against dynamic, continuously evolving cyber threats. Furthermore, by heavily relying on manual, human design and curation, they are also subject to human error and potential insider threats. Accordingly, the need exists for methods and systems for generating playbooks that are more agile in responding to continuously evolving cyber threats and less vulnerable to human error or potential insider threats.

The present disclosure addresses this need by moving away from static, human-in-the-loop playbook generation to fully dynamic and/or machine learning-augmented playbook generation. The present disclosure provides techniques for generating and/or updating playbooks dynamically by incorporating the latest cyber defense tools, capabilities, and tactics. It also incorporates real-time, cyber situational awareness (threats, assets, available tools, & best practices) to dynamically optimize protection levels and available resource utilization. Furthermore, it eliminates shortcomings of static playbooks, such as inherent obsolescence, lack of coverage due to changing environments, or their inherent assumption that certain resources would be available at the time of execution.

Specifically, a cyberattack may disable a security tool that is used by a static playbook, thus rendering the static playbook ineffective. As is discussed further below, the disclosure provides a method and system for generating dynamic playbooks which assess the inventory of security tools that is available after a cyberattack is detected, and generates a playbook for countering the cyberattack that includes only commands for those tools that are currently available. In this way, the generated playbook is guaranteed to not include tools that have been disabled by the cyber-attack.

As noted above, today's playbooks are static in nature and hand-curated by a subject matter expert. Consequently, they are inadequate when it comes to protecting today's fast-changing, software-defined IT/OT environments and continuously evolving threat landscape. By contrast, the techniques examples of which are presented in the disclosure leverage a combination of real-time cyber asset and countermeasures inventory data, as well as the latest Tactics, Techniques, and Protocols (TTPs) and available threat intelligence to auto-generate and maintain right-sized, realistic playbooks on demand or on a schedule.

In another aspect, automated playbook creation reduces the potential for human error and speeds up response times, thus reducing the adversary's window of opportunity and limiting the potential damage they can inflict. Automated playbook creation increases the cyber resiliency of a system as dynamic playbooks is able to leverage and optimize the utilization of currently existing and available assets and resources, which in turn causes the generated playbooks to be more responsive by not wasting time on trying to engage cyber assets that might be compromised, disabled, or taken offline during a cyberattack or by an insider.

Unlike static and/or manual playbook creation, dynamic playbook generation allows to adjust the order and priority in which assets are protected on the fly. Furthermore, dynamic playbook generation enables the inclusion of offensive and defense cyber TTPs and best cyber security practices (e.g., Mitre D3FENDTM TM) in the playbook generation process for risk-adaptive cyber defense. And still furthermore, dynamic playbook generation enables on-the-fly, risk-driven playbook generation and response.

FIG. 1 is a diagram of an example of an enterprise network 100, according to aspects of the disclosure. As illustrated, the enterprise network may include one or more computing devices 102, a communications network 104, and a security monitoring system 106. Each of the computing devices 102 may include a computing device, such as the computing device 1000 that is discussed further below with respect to FIG. 10. By way of example, each of the computing devices 102 may include a desktop computer, a laptop computer, a printer, a smartphone, and/or any other suitable type of computing device. The communications network 104 may include one or more of a local area network (LAN), a wide area network (WAN), the Internet, a wireless network, such as an 802.11 network, a cellular network, such as a 5G network, and/or any other suitable type of communications network. The security monitoring system 106 may include one or more computing devices, such as the computing device 1000, which is discussed further below with respect to FIG. 10. The operation of the security monitoring subsystem 106 is discussed further below with respect to FIG. 2.

Figure 2:
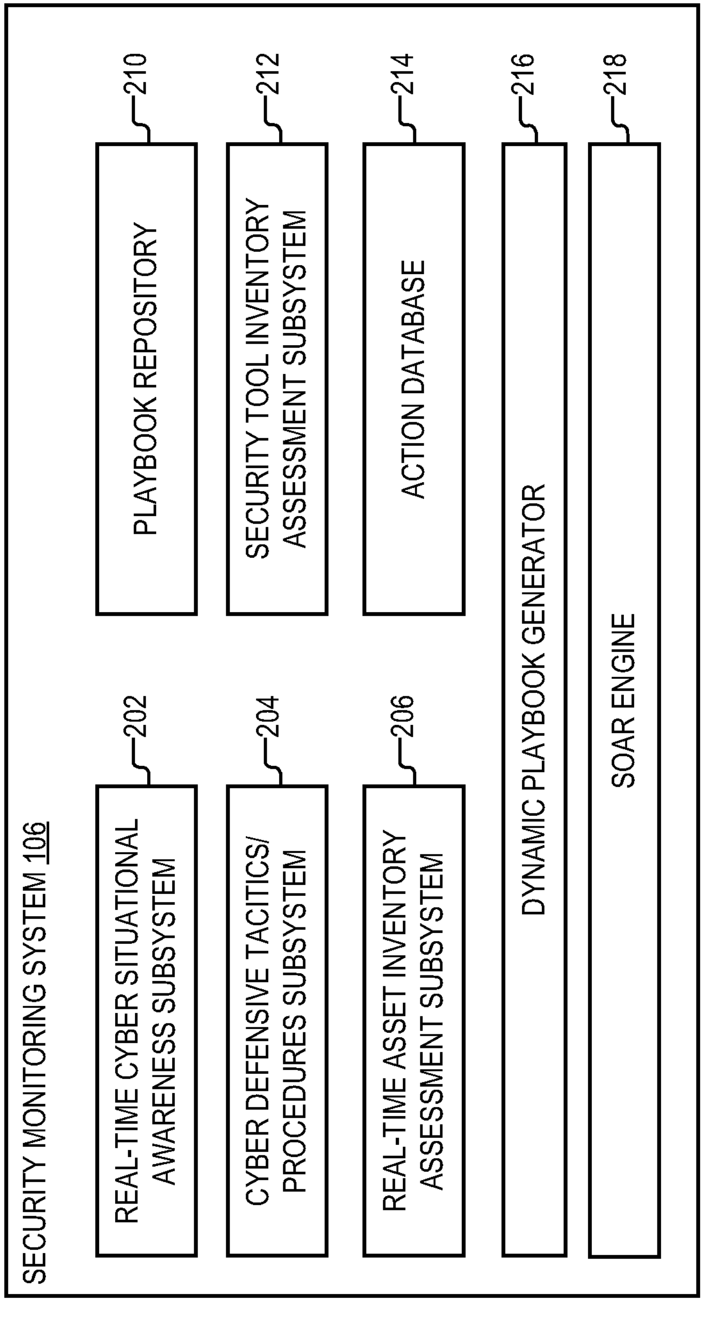
FIG. 2 is a diagram of an example of a security monitoring system, according to aspects of the disclosure.

FIG. 2 is a diagram of the security monitoring system 106, in accordance with one implementation. As illustrated, the security monitoring system 106 may include a real-time cyber situational awareness subsystem 202, a cyber defensive tactics/procedures subsystem 204, a real-time asset inventory assessment subsystem 206, a playbook repository 210, a security tool inventory subsystem 212, an action database 214, a dynamic playbook generator 216 and a security automation and response (SOAR) engine 218. Although in the example of FIG. 2, elements 202-214 and 218 are depicted as being part of the security monitoring system 106, it will be understood that one or more elements 202-212 and 218 may be executed fully or partially on any of the devices 102.

The subsystem 202 may include any suitable type of real-time cyber situational awareness subsystem. By way of example, the subsystem 202 may include a Security Information and Event Management (SIEM) system and/or any other suitable type of threat intelligence platform.

The subsystem 204 may include a knowledge database of cybersecurity countermeasure techniques. The database may identify a plurality of cyberthreats (e.g., by cyberthreat event code, etc.). For each of the cyberthreats, the database may identify one or more templates. Each of the templates may identify actions that may be taken to neutralize or counteract the threat. In some implementations, the subsystem may include the Mitre D3FEND TM system or the Mitre Att&Ck TM system.

The subsystem 206 may be configured to identify one or more of: (i) users that are currently logged in the enterprise network 100, (ii) devices that are connected to (or are otherwise part of) the enterprise network 100, (iii) different networks that are part of the enterprise network 100, (iv) different applications and services that are executed in the enterprise network 100, (iv) different file servers that are available in the enterprise network 100, and (v) the types of data that are stored in the file servers. In other words, the subsystem 206 may be arranged to track what assets are currently present in the enterprise network.

The playbook repository 210 may be configured to store one or more playbooks that have been generated and/or used in the past. The stored playbooks may be manually generated playbooks and/or automatically generated playbooks. In some implementations, the playbook repository 210 may identify a plurality of cyberthreats (e.g., by cyberthreat event code, etc.). For each of the cyberthreats, the playbook repository 210 may identify one or more playbooks for responding to the cyberthreat.

The subsystem 212 may identify one or more security tools that are available in the enterprise network 100. In some implementations, the subsystem 212 may identify a plurality of devices that are part of the enterprise network 100 (e.g., devices 102, etc.). For each of the devices, the subsystem 212 may identify one or more security tools that are currently executing on the devices. Examples of security tools include ELECTRONIC_ARMOR, BOOT_SHIELD, FORCEPOINT_DLP, and APP_GATE, all of which are discussed further below with respect to FIG. 4. In instances, in which a security tool is disabled on a particular device (e.g., by malicious code), the disablement may be reflected in the subsystem 212. The subsystem 212 may provide the playbook generator 216 with real-time information on the availability of various security tools in the enterprise network 100, which can be subsequently used by the playbook generator 216 when generating a playbook to ensure that there is an available security tool for executing each of the playbook commands in the playbook. Furthermore, in some implementations, the subsystem 112 may be configured to approximate the functionality of a security tool that might have been compromised or removed from the baseline by a malicious attack. Specifically, the subsystem 112 may be configured to emulate the functionality of the disabled security tool by combining two or more other security tools' commands to achieve a similar effect as a command that is normally provided by the disabled security tool. In some implementations may be configured to determine the inventory of available security tools in real-time or near-real-time.

The action database 214 may map actions to security tools that can perform the actions. For each of the actions, the action database 214 may identify one or more security tools that are capable of performing the action. Examples of actions that can be listed in the database 214 include "disable user account", "terminate process", "lock drive", "lock folder", and "remove endpoint". However, the present disclosure is not limited to any specific action being identified in the action database 214.

The playbook generator 216 may include software and/or hardware that is configured to dynamically generate playbooks. The operation of the playbook generator is discussed further below with respect to FIGS. 3-9. The SOAR engine 218 may include any suitable type of software that is configured to execute one or more playbooks that are generated by the playbook generator 216. The present disclosure is not limited to any specific implementation of the SOAR engine 218.

Figures 3, 4:
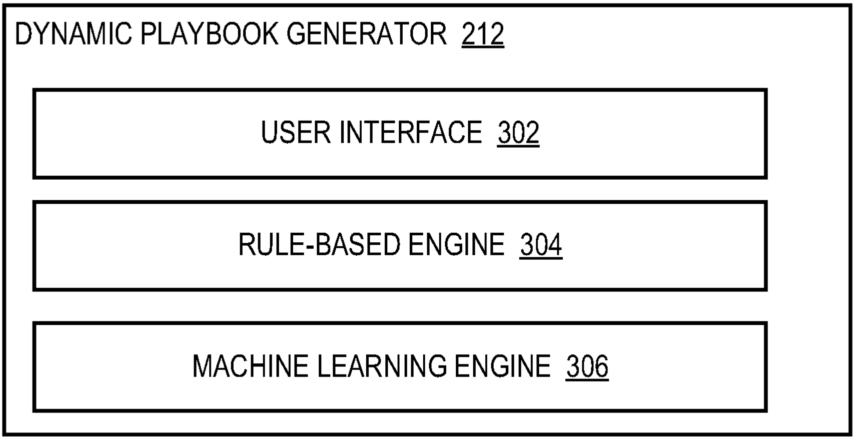
FIG. 3 is a diagram of an example of a dynamic playbook generator, according to aspects of the disclosure.
FIG. 4 is a diagram of an example of a playbook, according to aspects of the disclosure.

FIG. 3 is a diagram of the playbook generator 216 according to aspects of the disclosure. As illustrated, the playbook generator 216 may include a user interface 302, a rule-based engine 304 and a machine learning engine 306. Although in the example of FIG. 3 the playbook generator 216 is depicted as including both the rule-based engine 304 and the machine learning engine 306, in some implementations the playbook generator 216 may include only one of the rule-based engine 304 and the machine learning engine 306.

The user interface 302 may include any suitable type of command line or graphical user interface. The rule-based engine 304 may be configured to generate a playbook based on heuristics and a template that is stored in the subsystem 204 and/or one or more action definitions that are provided as user input.

The machine learning engine 306 may be configured to receive a signature as input and output a playbook that is generated (by the engine 306) based on the signature. The signature may identify a type of a cyberthreat event, an inventory of available security tools, and/or context information associated with the cyberthreat event. The context information may identify one or more of: (i) the device where the cyberthreat was detected (e.g., the IP number of the device), (ii) the type of the device (e.g., a workstation, a printer, etc.), (iii) one or more processes that are being executed on the device, (iv) the date and time when the cyberthreat was detected, (v) any storage locations or files that are being accessed by the device when the cyberthreat was detected or in a specific period preceding the detection of the cyberthreat, (vi) the amount of data that was pulled by the device in a specific period preceding the detection of the cyberthreat, (vii) the type of information that was being accessed on the device in a specific period preceding the detection of the cyber threat, and/or any other suitable information. In some implementations, the machine learning engine may be trained by using a supervised learning algorithm and/or in any other suitable manner. In some implementations, the machine learning engine 306 may implement a neural network, a decision tree, and/or any other suitable machine learning model. In another aspect, the machine learning engine 306 may use feedback from a human operator/security analyst for improving the performance of automatically generated playbooks based on the actual performance of past playbooks that are generated by the machine learning engine. In other words, the machine learning engine may implement a supervised learning algorithm in some implementations.

FIG. 4 is a diagram of an example of a playbook 400, according to aspects of the disclosure. As illustrated, the playbook 400 may include playbook commands 402-408. Each of playbook commands 402-408 may specify an action that needs to be performed, the subject of the action, and the security tool that is required to perform the action. As noted above, the playbook 400 may be executed by the SOAR engine 218. Executing any of the playbook commands 402-408 by the SOAR engine 218 (shown in FIG. 2) may include causing the security tool of the playbook command to perform the action specified by the playbook command on the subject that is identified in the playbook command. In the example of FIG. 4, playbook command 402 involves using security tool ELECTRONIC_ARMOR to terminate the process having an ID of 132242. Playbook command 404 involves using security tool BOOT_SHIELD to lock the C-drive in a system. Playbook command 406 involves using security tool FORCEPOINT_DLP to lock the home folder of a particular user. Playbook command 408 involves using security tool APP_GATE to remove a particular device from the enterprise network 100. Although not shown, the playbook 400 may include program logic, expressed by language constructs, such as selection, iteration, and sequences of instructions. Furthermore, as illustrated in FIG. 4, any of the commands in the playbook may have arguments or parameters.

Figure 5:
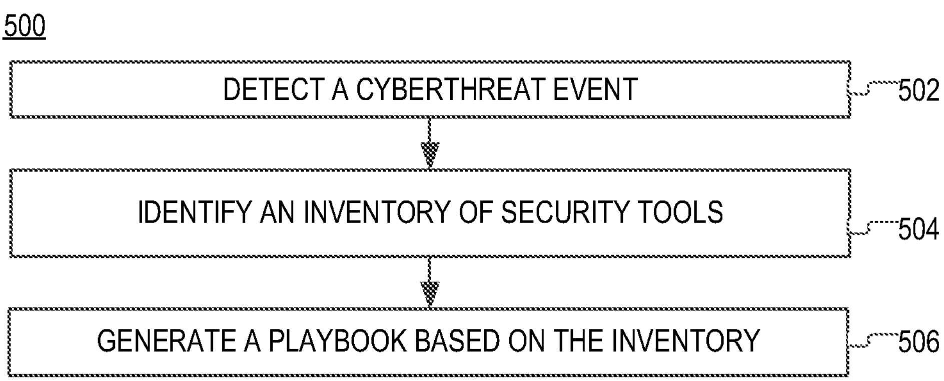
FIG. 5 is a flowchart of an example of a process, according to aspects of the disclosure.

FIG. 5 is a flowchart of an example of a process 500, according to aspects of the disclosure. In the example of FIG. 5, the process 500 is performed by the playbook generator 216. However, the present disclosure is not limited to any specific entity performing the process 500.

At step 502, the playbook generator 216 detects a cyberthreat event. The cyberthreat event may be generated by any security software running on any of the devices 102 (shown in FIG. 1). The cyberthreat event may include one or more of an identifier of the cyberthreat, an identifier of the device 102 where the cyberthreat is detected, and/or any other suitable type of information. By way of example, the cyberthreat may involve the execution of malicious code on the device 102, the insertion of an unauthorized USB stick into the device 102, an unauthorized attempt to access a particular file or file server, and/or any other suitable type of cyberthreat event. Additionally or alternatively, in some implementations, the cyberthreat event may be generated in response to a system administrator providing input to a computing device, such as a computing device that is part of the system 106. Additionally or alternatively, the event may be generated automatically by the system 106 based on a schedule for generating/updating playbooks. In some implementations, the event may include event metadata that could provide context for the event's associated cyberthreat.

At step 504, the playbook generator 216 identifies the inventory of security tools that are available on the device where the cyberthreat is generated. Specifically, the playbook generator 216 may detect what security tools are currently executing (and/or available) on the device 102 or security monitoring system 106 where the cyberthreat is detected. Step 504 may be performed by using the security tool inventory assessment subsystem 212 (shown in FIG. 2).

At step 506, the playbook generator 216 generates a playbook based on the inventory of security tools (identified at step 504). According to the present example, the generated playbook includes only playbook commands for security tools that are part of the inventory and it does not include playbook commands for security tools that are not part of the inventory. Thus, if the cyberthreat is generated in response to malicious code executing on the device, and the malicious code has disabled a particular security tool, the disabled security tool would not be identified as part of the inventory, and the playbook would not include playbook commands for that security tool. Step 506 may be performed in accordance with any of processes 600-900, which are discussed further below with respect to FIGS. 6-9. In some implementations, after the playbook is generated, the playbook may be executed by the SOAR engine 218 and/or stored in the playbook repository.

Figure 6:
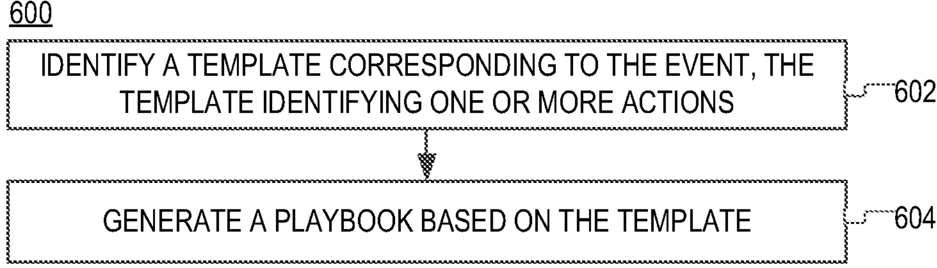
FIG. 6 is a flowchart of an example of a process, according to aspects of the disclosure.

FIG. 6 is a flowchart of an example of a process 600 for generating a playbook, as specified by step 506 of the process 500. At step 602, the playbook generator 216 retrieves a template associated with the cyberthreat (detected at step 502). The template may be retrieved from the subsystem 204. The template may identify a plurality of actions that may be performed in response to the cyberthreat. At step 604, the playbook generator 216 generates a playbook based on the template. Generating the playbook based on the template may include: instantiating a new playbook, generating a respective playbook command for each (or at least one) of the actions that are identified in the template, and inserting the playbook command(s) into the instantiated playbook. In some implementations, the instantiated playbook include a command to invoke another playbook. In this regard, in some implementations, any of the commands that are generated by the playbook generator 216 may be a command to invoke another playbook. As can be readily appreciated, the playbook command for any of the actions identified in the template may be a command, which when executed, would cause the action to be performed. In some implementations, step 604 may be performed by using the rule-based engine 304 (shown in FIG. 3).

An example is now provided of a method for generating a playbook command based on an action that is part of the template (identified at step 602). For example, the template may define the action of "lock user's home folder". In response to this definition, the playbook generator 216 may identify a security tool that is capable of performing the action, which is also part of the inventory (identified at step 504). The security tool may be identified by using the action database 214 and the subsystem 212. Next, the playbook generator 216 may identify the user who was logged on the device where the cyberthreat was detected (at step 602). The user may be identified by using the subsystem 206. Next, the playbook generator 216 may identify the path of the user's home folder. Next, the playbook generator may generate a playbook command that is associated with the identified security tool, which includes the user's home folder path as an argument. And finally, after the playbook command is generated, it may be inserted in the playbook that is instantiated.

Continuing with the above example, in some instances, the playbook generator 216 may be unable to find in the inventory (identified at step 504) a security tool that is capable of performing the original action. In such instances, the playbook generator 216 may identify a substitute action. Next the playbook generator 216 may identify a security tool that is part of the inventory (identified at step 504), which is capable of performing the substitute action. Next, the playbook generator may generate a playbook command for performing the substitute action. The playbook command may be associated with the identified security tool that is capable of performing the substitute action. And finally, after the playbook command is generated, the playbook command for the substitute action may be inserted into the playbook.

The substitute action may be identified based on the database (not shown) that is part of the playbook generator 216. The database may include a plurality of entries. In some implementations, the entries may be populated by an expert. Each of the entries may identify two or more actions that are designated by the expert as each other's substitutes. In this regard, the substitute action may be identified by performing a search of the database based on the original action. As noted above, in the present example, the original action is "lock user's home folder". For this particular action, a substitute action may be "lock user out of the user's device".

In other words, the playbook generator 216 may be arranged to dynamically match commands to desired effects (or outcomes). As noted above, if a security tool is no longer available (e.g., retired, temporarily taken offline for maintenance, undergoing an upgrade, or intentionally disabled by an cyber attacker/malware), the playbook generator 216 may emulate the protections that tool was able to provide by combining commands from any remaining or new security tools that are currently part of the inventory.

Figure 7:
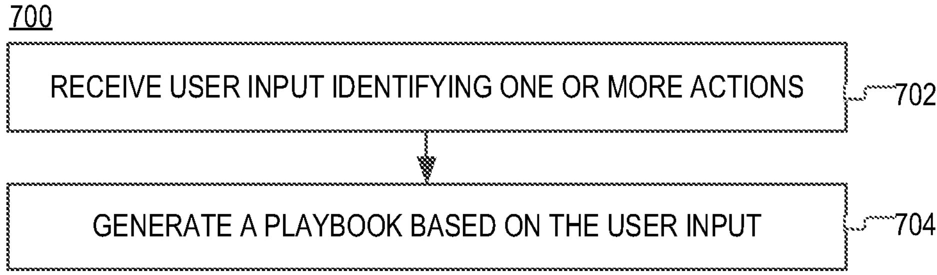
FIG. 7 is a flowchart of an example of a process, according to aspects of the disclosure.

FIG. 7 is a flowchart of an example of a process 700 for generating a playbook, as specified by step 506 of the process 500. At step 702, the playbook generator 216 receives user input defining one or more actions. The user input may be received via the user interface 302 (shown in FIG. 3). In some implementations, any of the action definitions that are received as user input may be the same or similar to the action definitions that are part of the template (identified at step 602). At step 704, the playbook generator 216 generates a playbook based on the user input. Generating the playbook based on the user input may include: instantiating a new playbook, generating a respective playbook command for each (or at least one) of the actions that are identified by the user input, and inserting the playbook command(s) into the template. As can be readily appreciated, the playbook command for any of the actions identified in the template may be a command, which when executed, would cause the action to be performed. In some implementations, step 704 may be performed by using the rule-based engine 304 (shown in FIG. 3). In some implementations, the rules employed by the rule-based engine 304 may be based on human and/or machine-derived heuristics.

An example is now provided of a method for generating a playbook command based on an action definition that is received as user input (at step 702). For example, the action definition may provide: "lock all storage drives on the device where a cyberthreat is detected". In response to this definition, the playbook generator 216 may identify a plurality of storage devices that are mounted on the storage device where the cyberthreat is generated. The storage devices may be identified by using the subsystem 206. Next, the playbook generator 216 may identify a security tool that is capable of locking storage devices, which is also part of the inventory (identified at step 504). The security tool may be identified by using the action database 214 and the subsystem 212. Next, for each of the storage identified storage devices, the playbook generator 216 may generate a respective playbook command for the identified security tool, which, when executed by the security tool, would cause the security tool to lock the storage device. After the playbook commands are generated, the playbook commands may be added to the playbook. As noted above, when no security tool is available in inventory that can perform the user-specified action, the playbook generator may identify a substitute action and insert in the playbook a command for the substitute action.

Figure 8:
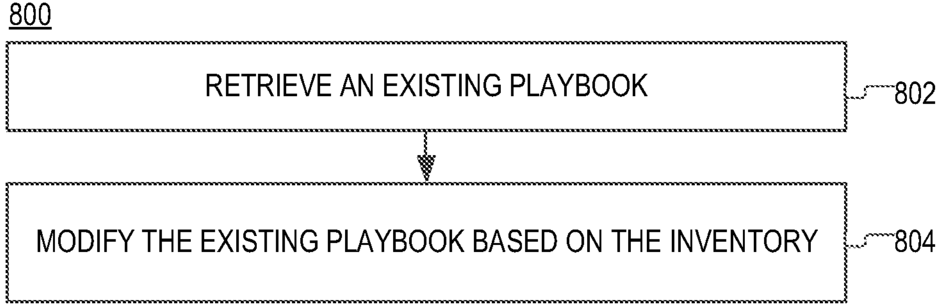
FIG. 8 is a flowchart of an example of a process, according to aspects of the disclosure.

FIG. 8 is a flowchart of an example of a process 800 for generating a playbook, as specified by step 506 of the process 500. At step 802, the playbook generator 216 retrieves an existing playbook from the repository 210; the retrieved playbook may be associated with the cyberthreat (identified at step 502). In some implementations, the playbook may be retrieved by performing a search of the playbook repository 210 based on a cyberthreat identifier that is associated with the cyberthreat event. At step 804, the playbook generator 216 modifies the retrieved playbook based on the inventory of available security tools (identified at step 504). Modifying the playbook may include deleting from the playbook all (or at least one) playbook commands that correspond to security tools that are not part of the inventory (identified at step 504). Optionally, modifying the playbook may further include inserting a substitution playbook command for at least one of the deleted playbook commands. The substitution playbook command, for any deleted playbook command, may be generated by: (i) identifying an action that is performed by the deleted command, (ii) using the action database 214 to identify another security tool that is part of the inventory (identified at step 504) which is capable of performing the action, (iii) generating a new command that causes the identified security tool to perform the same action as the deleted playbook command, and (iv) inserting the new playbook command in the playbook. Additionally or alternatively, in some implementations, modifying the playbook may include adding a new playbook command to the playbook. In some implementations, the new playbook command may be a command for a security tool that was not available when the original playbook was generated. Adding the new command may help bolster the playbook. Additionally or alternatively, in some implementations, modifying the playbook may include substituting one of the commands in the playbook with a new playbook command. The security tool for the command being substituted and the security tool for the new command may both be part of the inventory, but the security tool for the new command may be more effective than the security tool for the new command may be more efficient or effective than the security tool for the old command. The security tool for the new command may be one that was not available when the original playbook was created.

Figure 9:
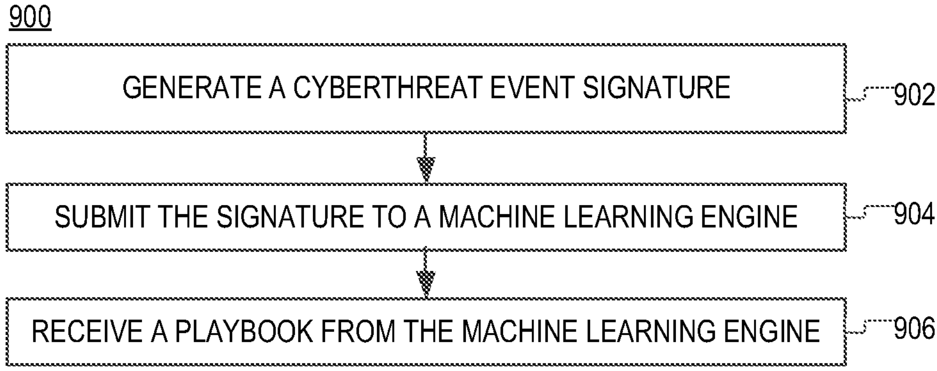
FIG. 9 is a flowchart of an example of a process, according to aspects of the disclosure.

FIG. 9 is a flowchart of an example of a process 900 for generating a playbook, as specified by step 506 of the process 500. At step 902, the playbook generator 216 generates a signature for the cyberthreat event (detected at step 502). The signature may be generated in the manner discussed above with respect to FIG. 4. The signature may include an indication of the cyberthreat that is associated with the event (detected at step 502). Additionally or alternatively, in some implementations, the signature may also include an indication of the inventory (identified at step 504). For example, the signature may include an indication of each (or at least some) of the security tools that are part of the inventory. Additionally or alternatively, in some implementations, the signature may include information about the context of the device where the cyberthreat event is generated. At step 904, the playbook generator 216 submits the signature to the machine learning engine 306 (shown in FIG. 3) and executes the machine learning engine 306 based on the signature. At step 906, playbook generator 216 receives a playbook that is generated by the machine learning engine 306 based on the signature. Additionally or alternatively, the signature may include information about the context of a specific asset that is associated with the device. The asset may be a service that is executed on the device or an application that is executed on the device.

Generative artificial intelligence (AI) (GenAI) can be used to auto-generate cyber playbooks. That is, GenAI can be used as at least part of the dynamic playbook generator 216. An example technique can for auto-generating cyber playbooks by GenAI can include:

Data Analysis and Pattern Recognition: GenAI can analyze vast amounts of historical cybersecurity data to identify patterns and trends (and possibly also highlight areas a cyber playbook might need to focus on). GenAI can also help in predicting future threats and formulating strategies (which also could include generating supporting cyber playbooks preemptively) to mitigate them.

Automated Playbook Creation: By learning from existing cyber threat data, GenAI can generate playbooks or checklists that recommend actions to guide analysts. This helps in accelerating detection and response while providing context and reasoning to aid in better decision-making.

Training and Simulation: GenAI can be used to create simulations of cyber attacks (and cyber playbooks). This allows cybersecurity professionals to train and in a virtual environment that mimics real-world scenarios and assess the efficacy of auto-generated cyber playbooks, thus helping to further optimize cyber playbooks.

Enterprise-scale IT Infrastructure & Cyber Security Knowledgebase: Many GenAI solutions store enterprise knowledge (e.g., IT infrastructure and cyber security-relevant information (e.g., inventory of corporate cyber security tools, network information, IT assets (e.g., phones, laptops, tables, servers, cloud-hosted assets) in so called vector databases. Embodiments can interface and leverage these GenAI-related services and information resources to assist with the creation and validation of the cyber playbooks. GenAI can help recommend, draft, validate, and improve cyber playbooks.

Figure 10:
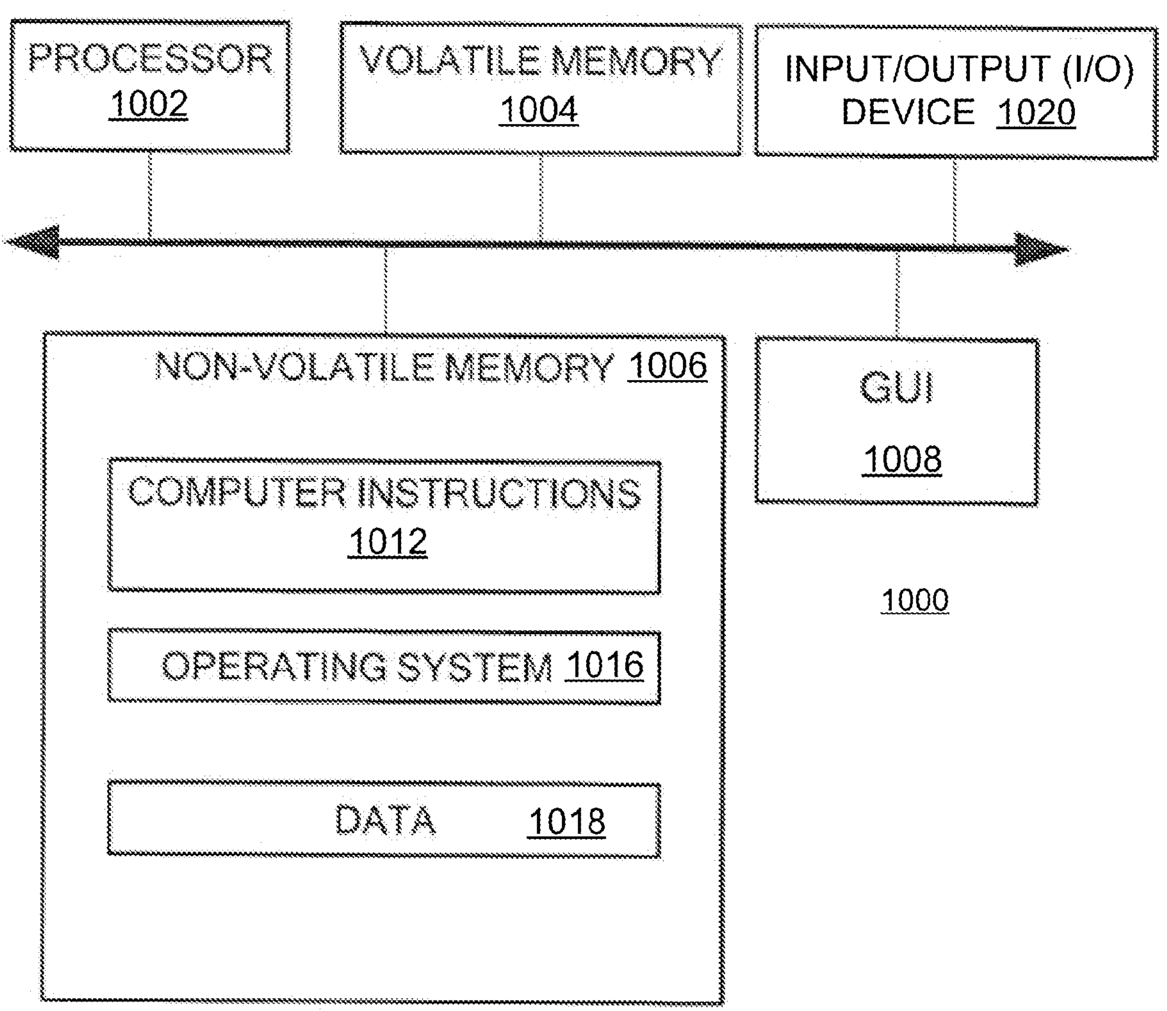
FIG. 10 is a diagram of an example of a computing device, according to aspects of the disclosure.

Referring to FIG. 10, in some embodiments, a computing device 1000 may include processor 1002, volatile memory 1004 (e.g., RAM), non-volatile memory 1006 (e.g., a hard disk drive, a solid-state drive such as a flash drive, a hybrid magnetic and solid-state drive, etc.), graphical user interface (GUI) 1008 (e.g., a touchscreen, a display, and so forth) and input/output (I/O) device 1020 (e.g., a mouse, a keyboard, etc.). Non-volatile memory 1006 stores computer instructions 1012, an operating system 1016 and data 1018 such that, for example, the computer instructions 1012 are executed by the processor 1002 out of volatile memory 1004. Program code may be applied to data entered using an input device of GUI 1008 or received from I/O device 1020.

FIGS. 1-10 provide examples of processes and systems that can be used to facilitate the generation of as-service offerings by an organization. The processes and systems can be used to evaluate the throughput of a system that is being offered under a guarantee that the system is capable of achieving specific throughput. The processes and system receive as input a hardware configuration for the system, and output an indication of whether the hardware configuration is capable of delivering the guaranteed throughput that is being.

In one aspect, the processes and systems take advantage of telemetry data to train a neural network (or another machine learning model) to classify hardware configurations according to expected throughput. Such telemetry data may be routinely reported by hardware as a matter of course or during interactions with customer support personnel.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the disclosure and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed disclosure. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed disclosure. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed disclosure.

It should be understood that the steps of the exemplary methods set forth herein are not necessarily required to be performed in the order described, and the order of the steps of such methods should be understood to be merely exemplary . . . / . . . . Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed disclosure might be made by those skilled in the art without departing from the scope of the following claims.

The invention claimed is:

1. A method, comprising;

detecting an event;

identifying one or more security tools that are currently part of an inventory of security tools;

generating a playbook based on the inventory, the playbook being generated responsive to the event, the playbook being a script that includes one or more commands, each of the commands corresponding to a respective security tool in the inventory of security tools, wherein generating the playbook includes:

generating a signature that identifies a plurality of security tools that are part of the inventory and includes information that is associated with the event;

submitting the signature to a machine learning (ML) engine; and receiving from the ML engine the playbook that is generated by the ML engine in response to the signature; and executing the playbook.

2. The method of claim 1, wherein the playbook is generated by retrieving an existing playbook and deleting, from the existing playbook, any commands that correspond to security tools that are currently not part of the inventory.

3. The method of claim 1, wherein generating the playbook includes:

retrieving a template corresponding to the event, the template identifying one or more actions;

generating a respective command that performs at least one of the actions, the respective command corresponding to one of the security tools that are currently part of the inventory; and including the respective command in the playbook.

4. The method of claim 1, wherein generating the playbook includes:

receiving a user input specifying an action;

generating a respective command that performs the action, the respective command corresponding to one of the security tools that are currently part of the inventory; and including the respective command in the playbook.

5. The method of claim 1, wherein generating the playbook includes:

identifying a first action, the first action being one of an action that is specified in a playbook template associated with the event or an action that is specified by a user input;

detecting whether any of the security tools that are currently in the inventory is capable of performing the first action;

when any of the security tools in the inventory is capable of performing the first action, generating a command for performing the first action, and including the command in the playbook; and when none of the security tools in the inventory is capable of performing the first action, identifying a second action that is designated as a substitute for the first action and can be performed by one of the security tools in the inventory, generating a command for performing the second action, and including the command in the playbook.

6. The method of claim 1, wherein the event includes a cyber alert event.

7. A system, comprising:

a memory; and at least one processor that is operatively coupled to the memory, the at least one processor being configured to perform operations of:

detecting an event;

identifying one or more security tools that are currently part of an inventory of security tools;

generating a playbook based on the inventory, the playbook being generated responsive to the event, the playbook being a script that includes one or more commands, each of the commands corresponding to a respective security tool in the inventory of security tools, wherein generating the playbook includes:

generating a signature that identifies a plurality of security tools that are part of the inventory and includes information that is associated with the event;

submitting the signature to a machine learning (ML) engine; and receiving from the ML engine the playbook that is generated by the ML engine in response to the signature; and executing the playbook.

8. The system of claim 7, wherein the playbook is generated by retrieving an existing playbook and deleting, from the existing playbook, any commands that correspond to security tools that are currently not part of the inventory.

9. The system of claim 7, wherein generating the playbook includes:

retrieving a template corresponding to the event, the template identifying one or more actions;

generating a respective command that performs at least one of the actions, the respective command corresponding to one of the security tools that are currently part of the inventory; and including the respective command in the playbook.

10. The system of claim 7, wherein generating the playbook includes:

receiving a user input specifying an action;

generating a respective command that performs the action, the respective command corresponding to one of the security tools that are currently part of the inventory; and including the respective command in the playbook.

11. The system of claim 7, wherein generating the playbook includes:

identifying a first action, the first action being one of an action that is specified in a playbook template associated with the event or an action that is specified by a user input;

detecting whether any of the security tools that are currently in the inventory is capable of performing the first action;

when any of the security tools in the inventory is capable of performing the first action, generating a command for performing the first action, and including the command in the playbook; and when none of the security tools in the inventory is capable of performing the first action, identifying a second action that is designated as a substitute for the first action and can be performed by one of the security tools in the inventory, generating a command for performing the second action, and including the command in the playbook.

12. The system of claim 7, wherein the event includes a cyber alert event.

13. A non-transitory computer-readable medium storing one or more processor-executable instructions, which, when executed by at least one processor cause the at least one processor to perform operations of:

detecting an event;

identifying one or more security tools that are currently part of an inventory of security tools;

generating a playbook based on the inventory, the playbook being generated responsive to the event, the playbook being a script that includes one or more commands, each of the commands corresponding to a respective security tool in the inventory of security tools, wherein generating the playbook includes:

generating a signature that identifies a plurality of security tools that are part of the inventory and includes information that is associated with the event;

submitting the signature to a machine learning (ML) engine; and receiving from the ML engine the playbook that is generated by the ML engine in response to the signature; and executing the playbook.

14. The non-transitory computer-readable medium of claim 13, wherein the playbook is generated by retrieving an existing playbook and deleting, from the existing playbook, any commands that correspond to security tools that are currently not part of the inventory.

15. The non-transitory computer-readable medium of claim 13, wherein generating the playbook includes:

retrieving a template corresponding to the event, the template identifying one or more actions;

generating a respective command that performs at least one of the actions, the respective command corresponding to one of the security tools that are currently part of the inventory; and including the respective command in the playbook.

16. The non-transitory computer-readable medium of claim 13, wherein generating the playbook includes:

receiving a user input specifying an action;

generating a respective command that performs the action, the respective command corresponding to one of the security tools that are currently part of the inventory; and including the respective command in the playbook.

17. The non-transitory computer-readable medium of claim 13, wherein generating the playbook includes:

identifying a first action, the first action being one of an action that is specified in a playbook template associated with the event or an action that is specified by a user input;

detecting whether any of the security tools that are currently in the inventory is capable of performing the first action;

when any of the security tools in the inventory is capable of performing the first action, generating a command for performing the first action, and including the command in the playbook; and when none of the security tools in the inventory is capable of performing the first action, identifying a second action that is designated as a substitute for the first action and can be performed by one of the security tools in the inventory, generating a command for performing the second action, and including the command in the playbook.

* * * * *